US012693659B2

(12) United States Patent
Herrmann

(10) Patent No.: US 12,693,659 B2
(45) Date of Patent: Jul. 28, 2026

(54) METHOD AND DEVICE FOR IDENTIFYING VARIABLES FROM A PLURALITY OF VARIABLES HAVING A DEPENDENCE ON A PREDETERMINED VARIABLE FROM THE PLURALITY OF VARIABLES

(71) Applicant: Robert Bosch GmbH, Stuttgart (DE)

(72) Inventor: Mark Herrmann, Radebeul (DE)

(73) Assignee: Robert Bosch GmbH, Stuttgart (DE)

( * ) Notice: Subject to any disclaimer, the term of this patent is extended or adjusted under 35 U.S.C. 154(b) by 538 days.

(21) Appl. No.: 18/447,641

(22) Filed: Aug. 10, 2023

(65) Prior Publication Data

US 2024/0053735 A1     Feb. 15, 2024

(30) Foreign Application Priority Data

Aug. 11, 2022     (DE) ..................... 10 2022 208 394.6

(51) Int. Cl.
*G06F 7/00*          (2006.01)
*G05B 19/418*      (2006.01)
*G06F 16/00*       (2019.01)

(52) U.S. Cl.
CPC ...  *G05B 19/41875* (2013.01); *G05B 19/4184* (2013.01); *G05B 2219/45031* (2013.01)

(58) Field of Classification Search
None
See application file for complete search history.

(56) References Cited

U.S. PATENT DOCUMENTS

2022/0036220 A1 *    2/2022   Barra ..................... G06N 5/043
2022/0269663 A1 *    8/2022   Raphael .............. G06F 16/2282

FOREIGN PATENT DOCUMENTS

DE          103 45 440 A1      5/2005

OTHER PUBLICATIONS

Solé et al., "Survey on Models and Techniques for Root-Cause Analysis", arXiv preprint arXiv: 1701.08546, Jul. 3, 2017 (18 pages).
Li et al., "Prediction of Power Outage Quantity of Distribution Network Users Under Typhoon Disaster Based on Random Forest and Important Variables," Mathematical Problems in Engineering, Jan. 2021, pp. 1-14, vol. 2021, No. 6682242, Hindawi, DOI:10. 1155/2021/6682242.
Zhang et al., "A Data-Driven Design for Fault Detection of Wind Turbines Using Random Forests and XGboost," IEEE Access, Apr. 2018, pp. 21020-21031, DOI:10.1109/ACCESS.2018.2818678.

(Continued)

*Primary Examiner* — Tuan A Pham
(74) *Attorney, Agent, or Firm* — Maginot, Moore & Beck LLP

(57)          ABSTRACT
A method is for identifying at least one variable from a plurality of variables having a dependence on a predetermined variable from the plurality of variables. The method includes providing a data set having data points for the plurality of variables for a plurality of products respectively and a selection of the predetermined variable from the plurality of variables. The method further includes preprocessing the data set, training a machine learning system on the pre-processed data set, and determining the dependencies of the variables on the predetermined variable based on the trained machine learning system.

12 Claims, 3 Drawing Sheets

(56) References Cited

OTHER PUBLICATIONS

Alfarizi et al., "An Extreme Gradient Boosting Aided Fault Diagnosis Approach: A Case Study of Fuse Test Bench," IEEE Transactions on Artificial Intelligence, Aug. 2023, pp. 661-668, vol. 4, No. 4, DOI:10.1109/TAI.2022.3165137.

Liu et al., "Data-Driven Identification Model for Associated Fault Propagation Path," Measurement, Dec. 2021, pp. 1-15, vol. 188 (2022), DOI: 10.1016/j.measurement.2021.110628.

Yuan et al., "Singular Value Decomposition Based Recommendation Using Imputed Data," Knowledge-Based Systems, Sep. 2018, pp. 485-494, vol. 163 (2019), Elsevier, DOI:10.1016/j.knosys.2018.09.011.

Wang et al., "Application of Machine Learning Missing Data Imputation Techniques in Clinical Decision Making: Taking the Discharge Assessment of Patients with Spontaneous Supratentorial Intracerebral Hemorrhage as an Example," BMC Medical Informatics and Decision Making, Jan. 2022, pp. 1-14, vol. 22, No. 13, DOI: 10.11 86/s12911-022-01752-6.

* cited by examiner

METHOD AND DEVICE FOR IDENTIFYING VARIABLES FROM A PLURALITY OF VARIABLES HAVING A DEPENDENCE ON A PREDETERMINED VARIABLE FROM THE PLURALITY OF VARIABLES

This application claims priority under 35 U.S.C. § 119 to patent application no. DE 10 2022 208 394.6, filed on Aug. 11, 2022 in Germany, the disclosure of which is incorporated herein by reference in its entirety.

The disclosure relates to a method for identifying variables from a plurality of variables having a dependence on a predetermined variable from the plurality of variables, preferably by means of a random forest, as well as a device, a computer program and a machine-readable storage medium.

BACKGROUND

Determining causes of a failure in a system, in particular in a production system, is known as the root cause analysis.

The publication of the authors Solé, M., Muntés-Mulero, V., Rana, A. I., & Estrada, G. (2017). Survey on models and techniques for root-cause analysis. arXiv preprint arXiv: 1701.08546, provides an overview of techniques for data-based modeling of system behavior and root cause analysis based on modeling.

SUMMARY

In the event that a first variable, which can be a categorical variable or a measurement, does not behave as desired and the goal is to find those variable(s) that have the greatest influence on the first variable, the disclosure has the advantage that a particularly stable and robust method is provided to reliably find these influences or dependencies between the variables. As the variable with the greatest influence can be used to identify a cause that led to the abnormal behavior of the first variable, the disclosure has the advantage that the cause of the undesired behavior can be found more reliably.

In a first aspect, the disclosure relates to a computer-implemented method for identifying at least one variable from a plurality of variables having a dependence on a predetermined variable from the plurality of variables. The variables each characterize measurements after production steps of a product or the production steps or machine settings of machines performing one of the production steps. An abstract (causal) relationship can be understood by the dependence, by which the identified variable affects the predetermined variable, i.e. the dependence can be considered a correlation.

The method begins with providing a data set comprising data points for a plurality of variables for a plurality of products respectively. The data set is preferably a matrix or table. The columns of the matrix are each assigned to one of the variables, while the rows each contain a data point that was recorded for the respective product for the respective variable. A line can also be understood as a measurement series. The data set can be sparsely occupied. It is therefore conceivable that the data set, in particular the matrix, has empty entries along the dimension for the variables as well as along the dimension for the products. That is to say, there are variables whose measurements or the like were not measured for the respective product, but other measurements for this product have already been carried out.

The products can be semiconductor products such as wafers or frames (a frame can be understood as an exposure field on a wafer, therefore a repetitive arrangement of individual chips on the wafer) or chips or other semiconductor components, which were particularly manufactured with the same manufacturing machines or in the same factory. The plurality of the products can be identical products or can differ in certain configurations with respect to each other. It is also conceivable that the plurality of the products are different products, which in particular were manufactured with the same production machines or at the same factory.

This is followed by selecting or defining the predetermined variable from the plurality of variables. The predetermined variable is to be the variable for which, for example, a non-tolerable deviation of its range of values or values is outside of a defined range of values. The predetermined variable can be selected because of its abnormal behavior for a product or a plurality of products. Preferably, a root cause analysis is to be performed for the predetermined variable. It is conceivable that the predetermined variable is provided by a user.

With regard to a pre-processing of the data set, it should be noted that in particular in the case that the data set has a very high number of variables, manual pre-selection of those variables can be made for which it is assumed that they have an influence on the predetermined variable.

The data set is then pre-processed. In the first step of the pre-processing, those variables and/or products are deleted, in particular row-by-row and/or column-by-column, which have a sparsity of data points greater than a predetermined threshold value. The sparsity can be understood to mean that data points do not exist for each product for a given variable, or data points do not exist for each variable for a given product. The sparsity can be stated as a percentage, for example, how many data points should ideally be given and how many data points are missing from this. For example, the threshold value is a percentage. For example, the threshold value for the data points of the products is $\leq 10\%$ and for the variables $<60\%$. The advantage of the first step is that it effectively achieves a reasonable sparsity of the data set. It is conceivable that the first step of pre-processing differentiates between missing data points that were not recorded but could have been recorded in practice and missing data points because the product was not manufactured for this purpose. For the missing data points that were not recorded but could have been captured in practice, they remain empty and will then be removed during sparse filtering. For the missing data points that were not recorded and for which the product was not manufactured for this purpose, "not processed" can be stored as a placeholder data point during the first step. This is a simple way to take into account the significance of non-existing data and advantageously reduce the sparsity.

In the second step of pre-processing, missing data points of the variables are imputed. In imputing, missing data points are replaced with a data point of the respective variable, which occurs most frequently or on average (e.g., median) over the plurality of the products. Based on this imputed data set, training a first machine learning system can be followed to predict the missing data points by the machine learning system depending on the given data points. The first machine learning system is preferably a small random forest having 300 to 500 trees. As a result, more suitable data points are predicted with the first machine learning system for the replaced (originally missing) data points. Preferably, a similarity measure is used to select the more suitable data points from the data points for the other products of the data set depending on the prediction of the first machine learning system and the data points for the respective variable. Alternatively, a weighted average value of the data points can be used for replacement, wherein the weights are proximities from the proximity matrix of the small random forest, or category with the greatest proximity to be used to predict the machine learning system. It is noted that proximities are a measure of similarity between two observations, which is higher the more often two observations land in the same end node of a given decision tree. Preferably, the steps of training the first machine learning system as well as replacing the data points with weighted averages are performed several times in a row to ultimately achieve as good imputation as possible.

Thereafter, there follows a training of a second machine learning system on the pre-processed data set. Training can be done by minimizing a MAE or RMSE for a regression and by maximizing an accuracy or kappa for classification. After the training is completed, a determination of the dependencies of the variables from the predetermined variable based on the second trained machine learning system follows. Preferably, the determination of the dependency is done by means of a permutation importance or impurity importance.

A root cause analysis can then be performed based on the dependencies.

It is noted that the training is preferably performed by the following steps: partitioning the data set into a training, testing and validation data set. It is also conceivable that the data set is additionally divided into a predictive data set comprising non-existing data points for the predetermined variable. This is followed by creating the machine learning system, wherein the machine learning system is trained with selected hyperparameters on the training data, wherein the machine learning system hyperparameters are evaluated on the validation data set, and the trained machine learning system is evaluated on the test data set.

It is proposed that the second machine learning system is a random forest. The random forest is an ensemble of decision trees that are constructed in slightly different ways, wherein each tree being is provided with a different subset of variables during training. That is, each tree receives a different subset of the training data and leaves a subset that is not used ("out of bag samples"). The random forest preferably contains 1500-3000 trees. Particularly preferably, a hyperparameter setting of the trees on the "out of bag samples" is performed, thereby requiring less validation data.

A majority vote of all trees forms the final model, and the predictor variables that contribute the most to purity gain across all trees are graded with the highest importance. As an alternative to the impurity importance, a permutation importance can be used.

Advantages of the random forest as a data-based modeling technique are that complex, non-linear correlations, in particular also between categorical variables, can be found without prior assumptions from experts. Another advantage is that experiments have shown that the random forest has a low overfitting and thus a reliable and robust behavior. Particularly advantageous is that the random forest can handle non-normalized data, missing data, as well as continuous and categorical data. Thus, the disclosure is particularly useful for semiconductor production, in which measurement data are usually sparse. Thus, in combination with the above-described methods for pre-processing the data set, a dependency analysis is provided that can be reliably used for a wide range of different applications.

Furthermore it is proposed that when preprocessing the data set after the first step, a pairwise correlation is additionally determined between a plurality of variables, wherein only one variable of the respective pair is selected for the pairs having a correlation that is, for example, greater than a predetermined threshold value, and the second variable is removed from the data set. It has become clear that the robustness of the method can be significantly increased by deletion of strongly correlated pairs.

It is further proposed that the correlation is determined based on a normalized mutual information. The normalized mutual information is given by: $2*I(X; Y)/(H(X)+H(Y))$, wherein I the mutual information is according to Shannon and H an entropy.

It is further proposed that, in the case of a classification, class balancing, such as an upsampling of one of the underrepresented classes or categories, is carried out during training. The class balancing has the advantage that the variables are distributed more evenly in the training data so that a balanced training data set is available, whereby sensible models for classifications with unbalanced classes (e.g. 95% good parts, 5% bad parts) can be achieved.

Furthermore, it is proposed that variables that characterize different components of a common product are aggregated. For example, multiple chips can be aggregated to one frame and/or multiple frames to one wafer. For the data points of the aggregated products, an aggregation method such as mean, median, P10 or P90, etc. can be used. This procedure has the advantage that data sets that are too large for RAM memory can be compressed accordingly. It is also conceivable that aggregation is performed via multiple variables across multiple products.

Furthermore, it is proposed that the data points have been recorded in a semiconductor factory, in particular the data points of the variables in-line measurements and/or PCM measurements and/or wafer level tests and/or characterize a wafer processing history. For example, the wafer processing history describes with which tool the wafer was processed and/or which formulation was used. In particular, the wafer history variables can be categorical variables, e.g., chamber A or B of tool, or similar tools for the individual production steps.

In a further aspect of the disclosure, the trained second machine learning system according to the first aspect of the disclosure can be used to predict the variables for future production steps, in particular to predict any measurements that can have been obtained, and to then decide if necessary whether to further process the product.

In further aspects, the disclosure relates to an apparatus and to a computer program, which are each configured to perform the aforementioned methods, and to a machine-readable storage medium on which said computer program is stored.

BRIEF DESCRIPTION OF THE DRAWINGS

Embodiments of the disclosure are explained in greater detail below with reference to the accompanying drawings. In the drawings.

DETAILED DESCRIPTION

Figure 1:
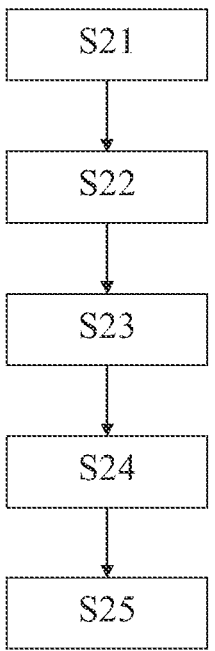
FIG. 1 schematically illustrates a flow chart of one embodiment of the disclosure.

FIG. 1 schematically shows a method for identifying or finding at least one variable from a plurality of variables having a dependence on a predetermined variable from the plurality of variables. For example, spikes are observed in a first measurement $V_T$, which cannot simply be explained with the usual suspicious measurements, such as e.g. $THK_{GD}$ variations. Using the method according to FIG. 1, variables, in particular their associated measurements, can be found that have an impact on the first measurement.

The method begins with providing (S21) a data set comprising data points for a plurality of variables for a plurality of products respectively, such as semiconductor components. The data set is provided as a matrix in this embodiment example. The variable is then selected from the plurality of the variables that have an atypical behavior or deviation, as exemplified above: the measurement of $V_T$.

A pre-processing (S22) of the data set then follows, wherein in a first step of pre-processing, a row-by-row and/or column-by-column deletion of those variables and/or products takes place which have a sparsity of the data points greater than a pre-determinable threshold value.

In the second step of pre-processing, missing data points of the variables are imputed, wherein during imputing, missing data points are replaced with a data point of the respective variable, which occurs most frequently or on average over the plurality of products. For the second step, there is then a training of a first machine learning system so that it can predict the missing data points. Thereafter, the replaced data points are replaced with new data points determined depending on a prediction of the first machine learning system.

Thereafter, a training (S23) of a second machine learning system follows on the pre-processed data set.

After the training step (S23), a prediction (S24) can optionally be performed. Herein, the trained second machine learning system is used to automatically predict missing data points of the variable selected after step S22, particularly if there are sufficient data points of the further variables for the respective product.

Thereafter, a determination (S25) of the dependencies of the variables from the predetermined variable based on the second trained machine learning system follows. For this purpose, a so-called Variable Importance Ranking is created with the second machine learning system, which lists the variables sorted according to their influence on the selected variable according to step S21. In other words, the variables are listed by their importance to the second machine learning system for categorizing the data set.

In a preferred embodiment of the method of FIG. 1, the categorization quality of the second machine learning system is evaluated after step S23 for fine tuning. Thus, for example, the variables with a low influence can be removed from the training data set according to step S25 and the sequence of steps S23 to S25 can be performed again. It is also conceivable for the evaluation of the second machine learning system that prediction errors of the machine learning system are considered and that the second machine learning system is retrained depending on the type of error.

Particularly preferably, a result of the method according to FIG. 1 is interactively visualized for evaluation so that an expert can selectively perform the evaluation via the visualization. This also has the advantage that expert knowledge is implicitly incorporated by the interactive visualization.

The dependences resulting from step S25 can then be used to optimize production steps and enable faster and more informed Design of Experiment (DoE) tuning of machines during the start-up phase of new production lines.

For example, if a measurement $V_T$ is outside of a specified or tolerable range, the Variable Importance Ranking from step S25 can be used to determine which variables from the data set correlate most strongly with the associated variable of the measurement $V_T$. From these correlating variables it can then be deduced to what extent a production process, which has an influence on the correlating variables, needs to be adjusted. Thus, it is possible to track which production step resulted in the incorrect measurements. That is, the method according to FIG. 1 can be used for root cause analysis. The adaptation can be done, for example, by adapting process parameters, preferably by adapting these process parameters in a control system accordingly.

It is also conceivable that the adjustment of the process parameters is dependent on an absolute deviation of the predetermined measurement to the specified or tolerable value range and can be done depending on an importance value of the Variable Importance Rankings from step S25 and optionally based on a physical domain model that can characterize dependences between the production steps and variables to be correlated. It should be noted that depending on the method just mentioned, variables can be identified that are redundant (because they are highly correlated) and thus their associated tests can be removed. This results in a reduction of a list of necessary tests and thus an advantageous reduction of the measurement time.

Figure 2:
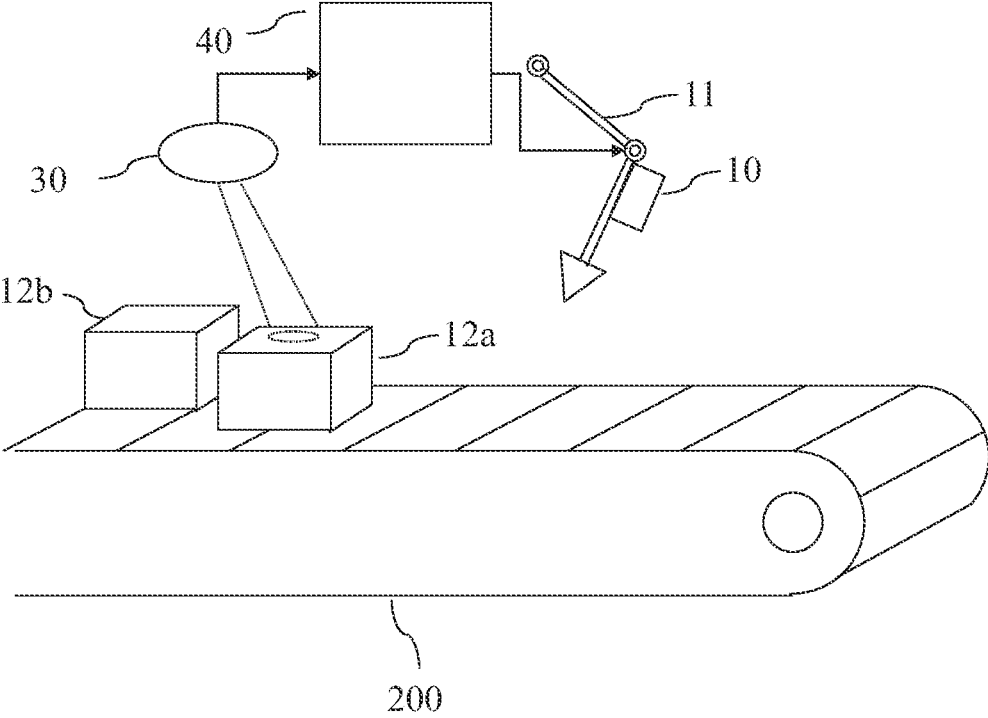
FIG. 2 schematically illustrates an embodiment example for controlling a manufacturing system.

FIG. 2 shows an embodiment example in which the control system 40 with the adapted process parameters is used to control a fabrication machine 11 of a fabrication system 200, in that this fabrication machine 11 controls the actuator 10. The fabrication machine 11 can be, for example, a machine for punching, sawing, drilling, milling, and/or cutting, or a machine that performs a step of a semiconductor production process, such as chemical deposition methods, etching and cleaning processes, physical deposition and cleaning methods, ion implantation, crystallization or temperature processes (diffusion, annealing, melting, etc.), photolithography, or chemical mechanical planarization.

For example, sensor 30 can be a measurement sensor or detector that captures characteristics of manufacturing products 12a, 12b, wherein the data points hereby recorded preferably are provided with the method of FIG. 1.

Figure 3:
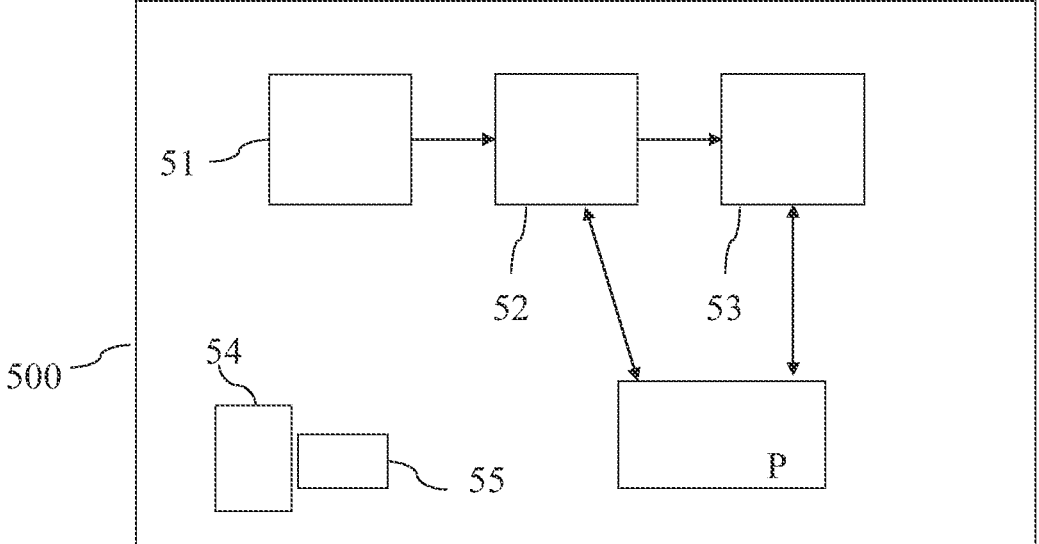
FIG. 3 schematically illustrates a training apparatus.

FIG. 3 schematically shows a training device 500 comprising a provisioner 51 that provides instances from a training data set. The instances are supplied to the training machine learning system 52 to be trained, which uses them as output variables to determine, for example, a classification or regression. Output variables and instances are supplied to an evaluator 53, which determines updated hyper-/parameters therefrom, which are transmitted to the parameter memory P and replace the current parameters there. The evaluator 53 is configured to perform steps S23 of the method shown in FIG. 1.

The methods carried out by the training apparatus 500 can be implemented as a computer program, stored on a machine-readable storage medium 54, and executed by a processor 55.

The term "computer" comprises any devices for processing pre-determinable calculation rules. These calculation rules can be in the form of software, or in the form of hardware, or also in a mixed form of software and hardware.

What is claimed is:

1. A computer-implemented method for identifying at least one variable from a plurality of variables having a dependence on a predetermined variable from the plurality of variables, the plurality of variables characterize measurements after production steps of a product or the production steps or machine settings of machines performing one of the production steps, the method comprising:

providing a data set comprising data points for a plurality of variables for a plurality of products respectively, and providing a predetermined variable from the plurality of variables;

pre-processing the provided data set by:

in a first step of pre-processing performed by a control system, those variables and/or products are deleted which have a sparsity of the data points greater than a predetermined threshold value, in a second step of pre-processing performed by the control system, missing data points of the variables are imputed, when imputed, missing data points are replaced with a data point of the respective variable, whichever occurs most frequently or on average over the majority of products, and training a first machine learning system, such that it predicts the missing data points, the imputed data points are replaced by new data points determined depending on a prediction of the first machine learning system;

training a second machine learning system on the pre-processed data set; and determining dependencies of the variables from the predetermined variable based on the second trained machine learning system.

2. The method of claim 1, wherein the second machine learning system is a random forest.

3. The method of claim 1, wherein:

when preprocessing the data set after the first step of pre-processing, pairwise correlations are additionally determined between the plurality of variables, and only one variable of the respective pair is selected for the pairs having a highest correlation and the second variable is removed from the data set.

4. The method of claim 3, wherein the correlations are determined based on normalized mutual information.

5. The method of claim 1, wherein, when training the second machine learning system, an underrepresented variable is upsampled.

6. The method of claim 1, wherein:

multiple variables are aggregated, and when aggregated, the data points of the variable to be aggregated are aggregated by averaging the corresponding data points.

7. The method of claim 1, wherein the predetermined variable has an abnormal behavior defined by having values outside of a specified range of values.

8. The method of claim 1, further comprising:

acquiring the data points in a semiconductor factory, wherein the data points of the variables corresponding to in-line measurements and/or pulse-code modulation (PCM) measurements and/or wafer level tests and/or a wafer processing history.

9. The method of claim 1, further comprising:

adjusting a production process for producing the products depending on the determined dependencies of the variables and depending on a range of values of the predetermined variable to be achieved.

10. The method of claim 1, wherein a device is configured to perform the method.

11. The method of claim 1, wherein a computer program comprises instructions that, when the computer program is executed by a computer, prompt the computer program to carry out the method.

12. The method of claim 11, wherein the computer program is stored on a non-transitory machine-readable storage medium.

* * * * *